(12) United States Patent
Harp

(10) Patent No.: US 11,824,782 B2
(45) Date of Patent: Nov. 21, 2023

(54) RATE LIMITER FOR DATABASE ACCESS

(71) Applicant: Idera, Inc., Houston, TX (US)

(72) Inventor: Vicky Harp, Kirkland, WA (US)

(73) Assignee: Idera, Inc., Houston, TX (US)

( * ) Notice: Subject to any disclaimer, the term of this patent is extended or adjusted under 35 U.S.C. 154(b) by 191 days.

(21) Appl. No.: 16/529,714

(22) Filed: Aug. 1, 2019

(65) Prior Publication Data

US 2020/0044972 A1 Feb. 6, 2020

Related U.S. Application Data

(60) Provisional application No. 62/713,552, filed on Aug. 2, 2018.

(51) Int. Cl.
*H04L 12/801* (2013.01)
*G06F 16/903* (2019.01)
*G06F 16/2455* (2019.01)
*G06F 16/25* (2019.01)
*H04L 47/10* (2022.01)

(52) U.S. Cl.
CPC ........ *H04L 47/18* (2013.01); *G06F 16/24568* (2019.01); *G06F 16/252* (2019.01); *G06F 16/90335* (2019.01)

(58) Field of Classification Search
None
See application file for complete search history.

(56) References Cited

U.S. PATENT DOCUMENTS

| | | | |
|---|---|---|---|
| 7,418,532 B2 * | 8/2008 | Suzuki | H04N 21/42646 710/36 |
| 3,014,281 A1 | 9/2011 | Lim et al. | |
| 8,521,891 B1 * | 8/2013 | Shinde | G06F 16/9574 709/230 |
| 8,543,685 B1 * | 9/2013 | Gormley | H04L 47/29 709/224 |
| 9,325,597 B1 * | 4/2016 | Clasen | H04L 41/5019 |
| 2003/0105863 A1 | 6/2003 | Hegli et al. | |
| 2008/0002593 A1 * | 1/2008 | Achtermann | H04L 47/781 370/252 |
| 2009/0106821 A1 * | 4/2009 | Kothari | G06F 21/10 726/3 |
| 2018/0330257 A1 | 11/2018 | Dodson et al. | |

OTHER PUBLICATIONS

Combined Search and Examination Report from the United Kingdom Intellectual Property in South Wales, dated Dec. 20, 2019 as filed in application No. GB1911014.7, pp. 1-7.
Canadian (CIPO) Examination Search Report prepared Jun. 30, 2021 for Canadian Patent Application No. 3,050,971, pp. 1-4.

* cited by examiner

*Primary Examiner* — Saba Tsegaye
(74) *Attorney, Agent, or Firm* — Kent B. Chambers; Terrile, Cannatti & Chambers, LLP

(57) ABSTRACT

A system and method rate limits database access to, for example, prevent or reduce damage from unauthorized or errant access of a database by enforcing a network-level limit to the amount of data that may be accessed from the database. In at least one embodiment, a data transfer rate limiter monitors data transfer and determines whether the data transfer exceeds one or more predetermined thresholds. Based on the determination, the data transfer rate limiter generates a control signal that controls one or more processes that appropriately address any the data rate transfer of concern.

24 Claims, 4 Drawing Sheets

RATE LIMITER FOR DATABASE ACCESS

CROSS-REFERENCE TO RELATED APPLICATION

This application claims the benefit under 35 U.S.C. § 119(e) and 37 C.F.R. § 1.78 of U.S. Provisional Application No. 62/713,552, filed Aug. 2, 2018, and entitled "RATE LIMITER FOR DATABASE ACCESS," which is incorporated by reference in its entirety.

BACKGROUND

Field of the Invention

The present invention relates in general to the field of databases and more specifically to a system and method to rate limit database access.

Description of the Related Art

Electronic databases have become ubiquitous in the environment of information processing. A database is an organized collection of data. During the course of normal operations with a database application, it is unusual for a database server to experience extreme variation in the amount of data being requested. Such variation may be a telltale sign of a programming bug or a data breach. An example would be a user workstation in a call center, which is typically used to pull up fewer than 100 individual account records per 8 hour day, but which is instead accessing many hundreds of thousands of database records on the weekend.

SUMMARY

In one embodiment, a method of limiting data transfer rate of data from one or more databases includes determining a data transfer rate of the data from the one or more databases, wherein the data transfer rate is a rate of data transferred from each database in response to a database query. The method also includes identifying one or more query associated parameters of the query and accessing rate limiting rules. The method further includes applying one or more of the rate limiting rules to a conjoint analysis of: (i) the data transfer rate, (ii) the one or more query associated parameters, and (iii) one or more data rate transfer thresholds correlated to the one or more query associated parameters to determine a data transfer control action. The method additionally includes applying the control action.

In another embodiment, a system includes a data processing system, and the data processing system includes a database. The data processing system also includes a database management system in communication with the database. The database management system is configured to retrieve data from the database that is responsive to a received query, transfer the responsive data in a data stream, and a data transfer rate limiter in communication with the database management system. The data transfer rate limiter is configured to determine a data transfer rate of the data from the one or more databases, wherein the data transfer rate is a rate of data transferred from each database in response to a database query. The data transfer rate limiter is also configured to identify one or more query associated parameters of the query and access rate limiting rules. The data transfer rate limiter is further configured apply one or more of the rate limiting rules to a conjoint analysis of: (i) the data transfer rate, (ii) the one or more query associated parameters, and (iii) one or more data rate transfer thresholds correlated to the one or more query associated parameters to determine a data transfer control action to determine a data transfer control action. The database management system is further configured to apply the control action.

In another embodiment, a non-transitory, computer readable program product includes code stored therein and executable by one or more processors to determine a data transfer rate of the data from the one or more databases, wherein the data transfer rate is a rate of data transferred from each database in response to a database query. The code is further executable by the one or more processors to identify one or more query associated parameters of the query and access rate limiting rules. The code is further executable by the one or more processors to apply one or more of the rate limiting rules to a conjoint analysis of (i) the data transfer rate, (ii) the one or more query associated parameters, and (iii) one or more data rate transfer thresholds correlated to the one or more query associated parameters to determine a data transfer control action to determine a data transfer control action.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method rate limits database access to, for example, prevent or reduce damage from unauthorized or errant access of a database by enforcing a network-level limit to the amount of data that may be accessed from the database. In at least one embodiment, a data transfer rate limiter monitors data transfer and determines whether the data transfer exceeds one or more predetermined thresholds. Based on the determination, the data transfer rate limiter generates a control signal that controls one or more processes that appropriately address any the data rate transfer of concern.

Figure 1:
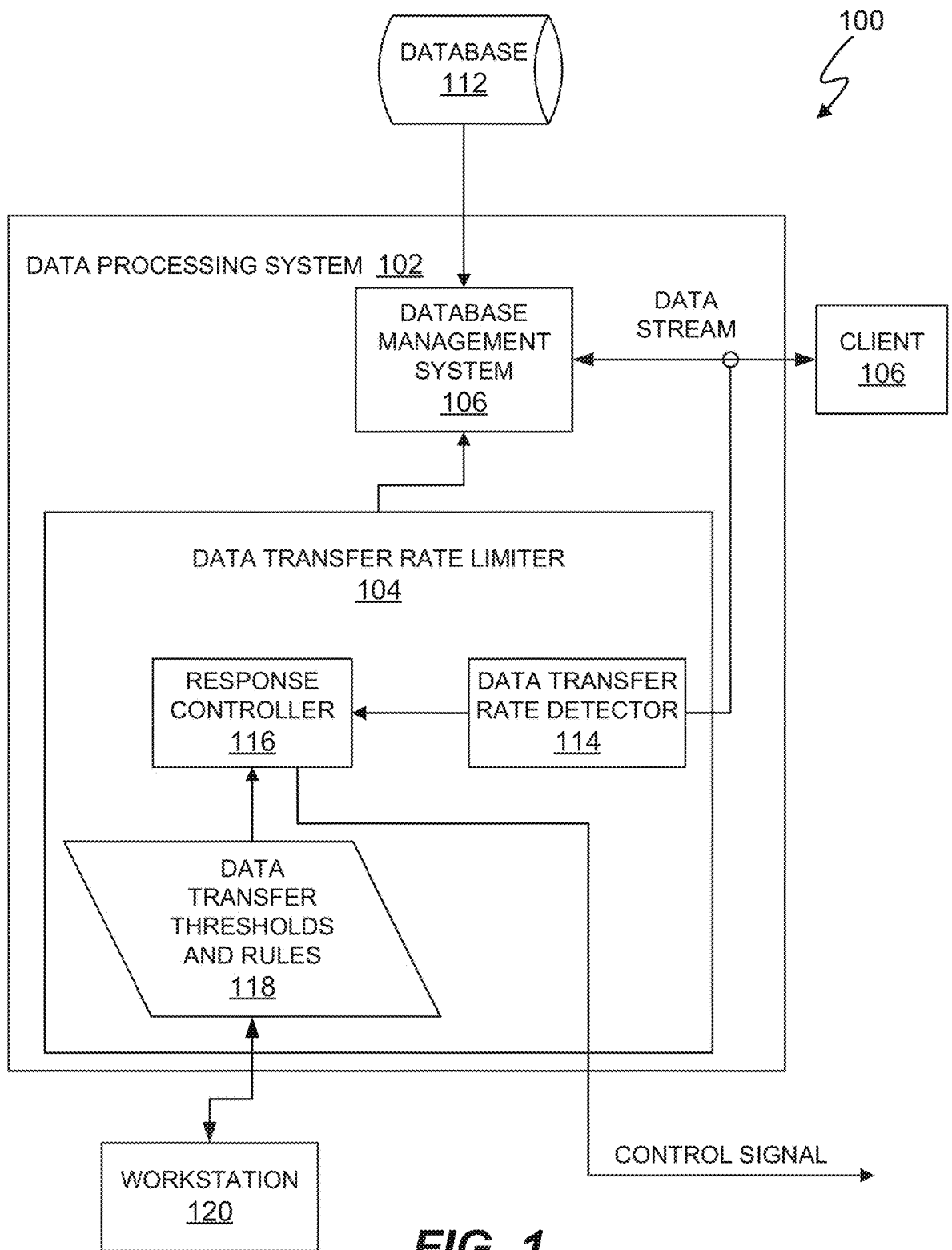
FIG. 1 depicts a network system that includes a data processing system and data transfer rate limiter.

FIG. 1 depicts a network system 100 that includes a data processing system 102 and data transfer rate limiter 104. The data processing system 102 is, for example, a database server that executes a database management system (DBMS) 106. The DBMS 106 can be any DBMS, such as a SQL Server, dBase, Oracle, and Sybase. The data transfer rate limiter 104 is shown as part of the data processing system 102, but, in other embodiments, the data transfer rate limiter 104 is a separate hardware component, a separate application, or included in the DBMS 106.

Figure 2:
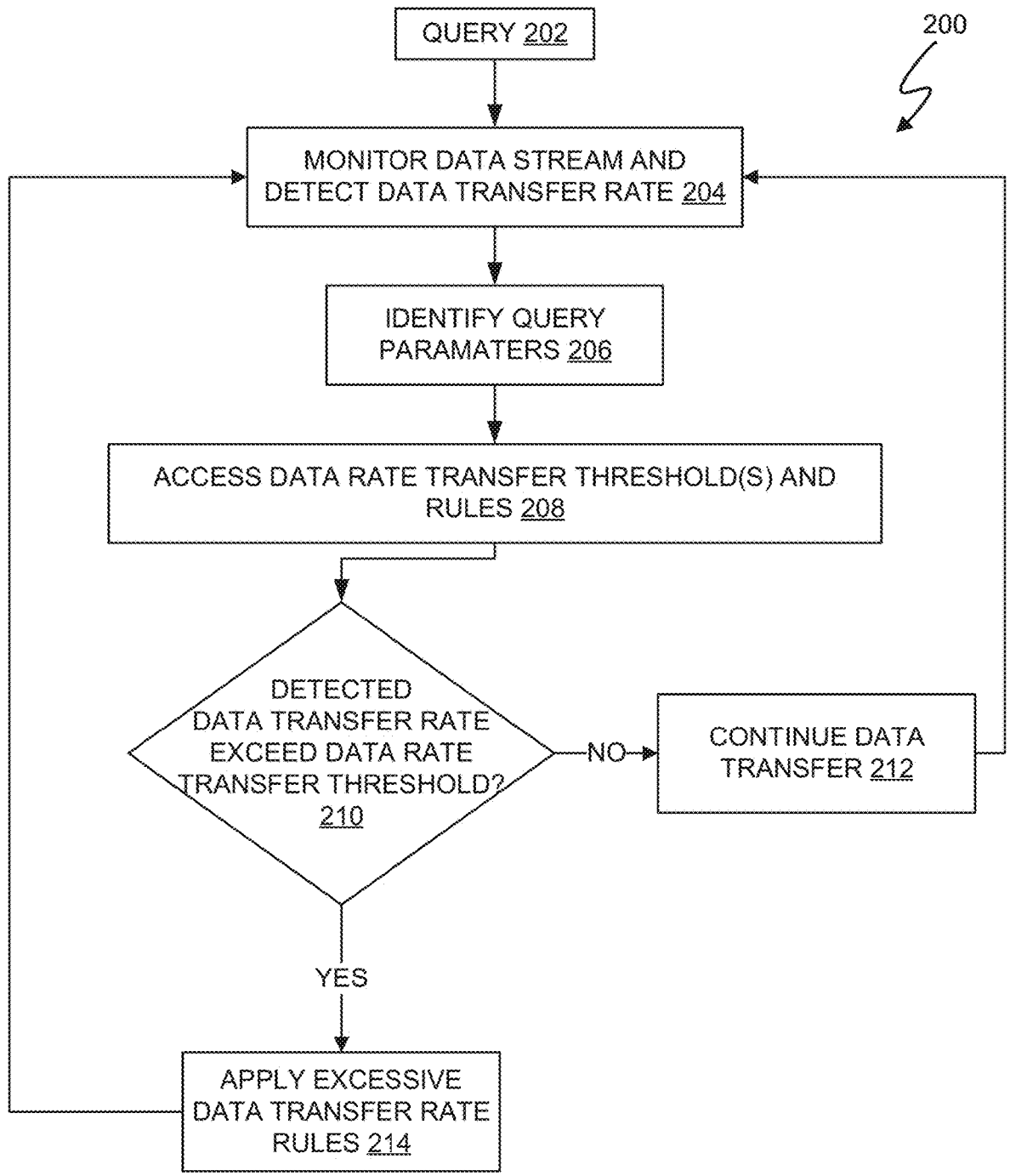
FIG. 2 depicts an exemplary data transfer rate limiting process

FIG. 2 depicts an exemplary data transfer rate limiting process 200. In at least one embodiment, the data transfer rate limiter 104 operates in accordance with the exemplary data transfer rate limiting process 200 depicted in FIG. 2. Referring to FIGS. 1 and 2, in operation 202 client computer system 206 sends a database query to database server 102.

The DBMS 106 operates normally to retrieve data from the database 112 that is responsive to the query. The DBMS 106 transfers the responsive data to client 106 in a data stream, such as a tabular data stream. In operation 204, a data transfer rate detector 114 included in the data transfer rate limiter 104 passively monitors the data stream and detects a data transfer rate of the data stream. The term "rate" is an inclusive term that refers an amount of data retrieved in a given period of time. The amount of data can be characterized in any number of ways including number of bytes or bits or a number of database records included in the data. The process and components for monitoring the data transfer rate are a matter of design choice. In at least one embodiment, the data transfer rate detector 114 is driver code that operates at an operating system level and determines the data transfer rate. In at least one embodiment, the data transfer rate detector 114 is a component of a network circuit card that determines the data transfer rate.

In operation 206, the data transfer rate detector 114 identifies one or more query associated parameters of the query such as an identify identity of client 106, a user of client 106, date and time of the query, table identifier, and other parameters that can allow the response controller 116 to generate a control signal and provide an appropriate control action. In operation 208, the response controller 116 accesses stored data transfer thresholds and rules 118 to determine whether and what control action is appropriate. The data transfer thresholds and rules 118 set thresholds such as data transfer rates, including data transfer rate quotas, correlated with the query associated parameters that trigger control actions. The particular application of the thresholds and rules can involve a conjoint analysis that takes into account multiple variables. For example, different data transfer rates can be correlated to different users. Thus, appropriate data transfer rate thresholds can be correlated to secondary factors such as the parameters associated with the query. For example, a nurse may have a threshold that indicates an expected number of patient record accesses, such as 20 patient records per hour, during certain days and time of day that correspond to the nurse's work schedule. However, a healthcare administrator may have a much larger expected access during the administrator's work times. During off times of an employee, the threshold may be much lower to match expected data access needs. Additionally, a data administrator system can have a different, higher data transfer rate threshold than a user that is not involved in maintaining and testing the database 112. Furthermore, some data may be particularly sensitive and have a fixed data transfer rate threshold that is independent of any other query associated parameter.

In operation 210, if the response controller 116 does not detect a data transfer rate that exceeds an appropriate threshold, in operation 212 response control 116 takes no action and allows the data stream to continue unabated. In operation 210, if the response controller 116 detects a data rate transfer that exceeds an appropriate threshold, in operation 214 the response controller 116 responds in accordance with an appropriate excessive data transfer rate rule. The appropriate excessive data transfer rate rule is a matter of choice and can establish a data transfer rate limit per user, per database, per machine, per access credential, per data type, etc. and involve a conjoint analysis that depends on the thresholds and rule variables. For example, the conjoint analysis can quantify an amount of deviation of the data transfer rate from the appropriate threshold, the identity of the query requestor, the type and sensitivity of data requested, and other parameters to determine an appropriate control action. The particular control action is a matter of design choice. For example, for minor deviations, the control signal may cause the data transfer rate and one or more query associated parameters to be logged to disk or memory. For more severe deviations, the control signal may send an alert to a system administrator, degrade the data transfer rate, stop the data transfer, or perform any other desired action by generating an appropriate control signal to control messaging systems, alarm systems, DBMS operation, shift databases, revoke user access, suspend user access, etc.

In at least one embodiment, the network system 100 includes a workstation 120 that can provide additional functionality, including allowing users to request deviations, informing users of data quota and access status, and optionally providing end to end encryption services.

Figure 3:
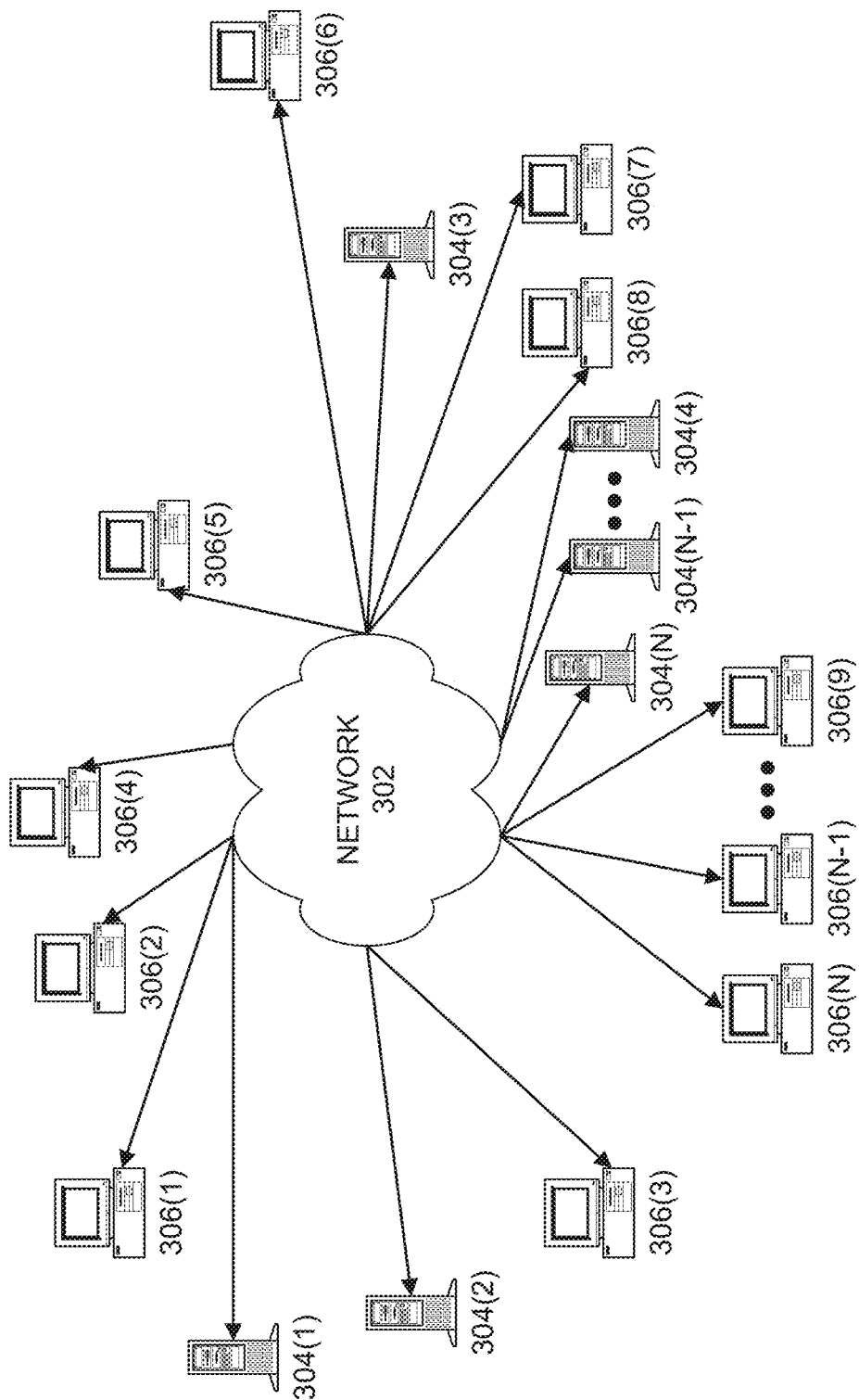
FIG. 3 depicts an exemplary network environment in which the system of FIG. 1 and the process of FIG. 2 may be practiced.

FIG. 3 depicts a network environment in which the data processing system 102 including the data transfer rate limiter 104 and data transfer rate limiting process 200 may be practiced. Network 302 (e.g. a private wide area network (WAN) or the Internet) includes a number of networked server computer systems 304(1)-(N) that are accessible by client computer systems 306(1)-(N), where N is the number of server computer systems connected to the network. Communication between client computer systems 306(1)-(N) and server computer systems 304(1)-(N) typically occurs over a network, such as a public switched telephone network over asynchronous digital subscriber line (ADSL) telephone lines or high-bandwidth trunks, for example communications channels providing T1 or OC3 service. Client computer systems 306(1)-(N) typically access server computer systems 304(1)-(N) through a service provider, such as an interne service provider ("ISP") by executing application specific software, commonly referred to as a browser, on one of client computer systems 306(1)-(N).

Client computer systems 306(1)-(N) and/or server computer systems 304(1)-(N) may be, for example, computer systems of any appropriate design, including a mainframe, a mini-computer, a personal computer system including notebook computers, a wireless, mobile computing device (including personal digital assistants, smart phones, and tablet computers). When programmed to implement at least one embodiment of the data processing system 102 and data transfer rate limiting process 200, the computer systems are specialized machines. These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. In at least one embodiment, the data processing system 102 and data transfer rate limiting process 200 can be implemented using code stored in a tangible, non-transient computer readable medium and executed by one or more processors. In at least one embodiment, the data processing system 102 and data transfer rate limiting process 200 can be implemented completely in hardware using, for example, logic circuits and other circuits including field programmable gate arrays.

Figure 4:
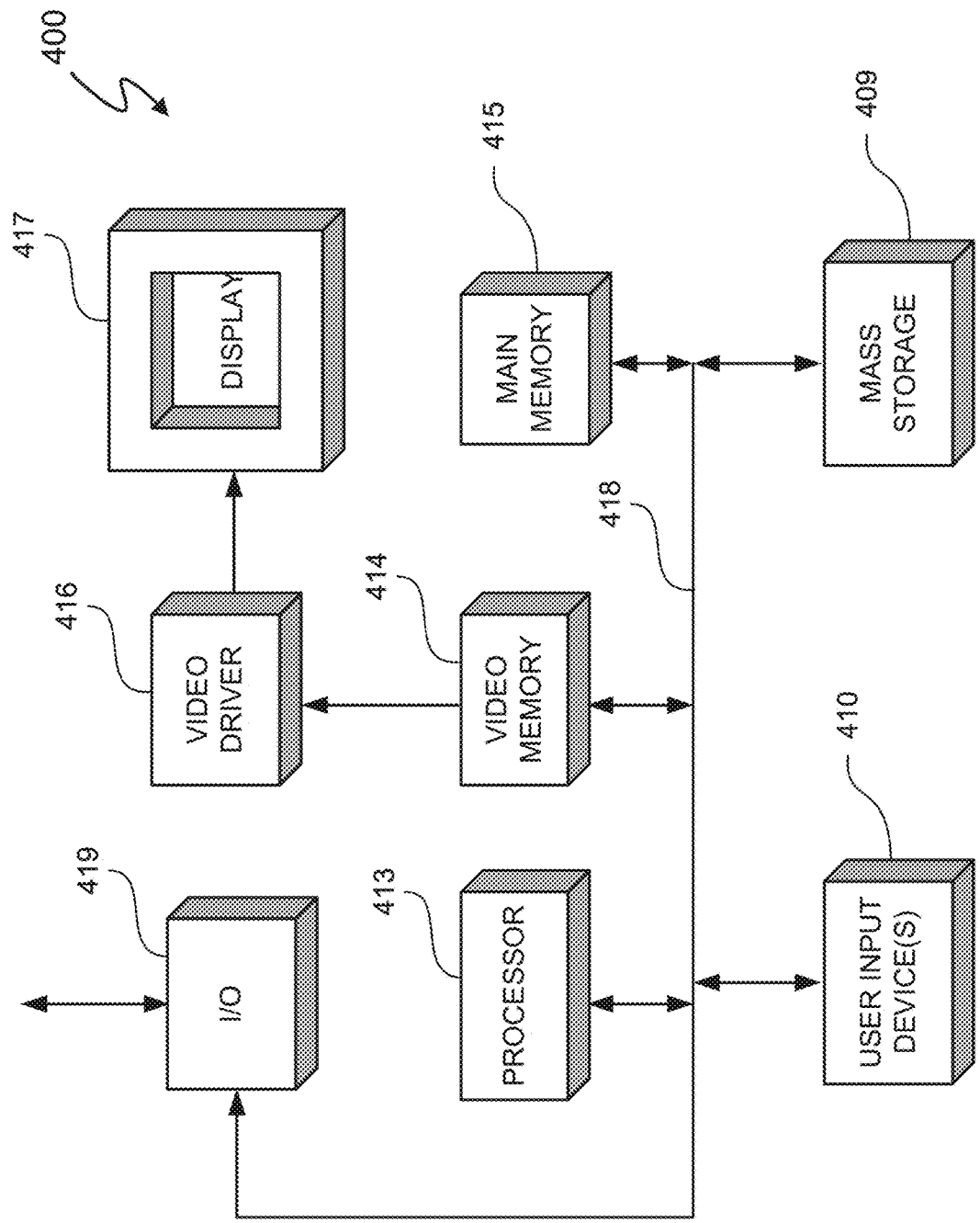
FIG. 4 depicts an exemplary computer system.

Embodiments of the data processing system 102 and data transfer rate limiting process 200 including the data transfer rate limiter 104 can be implemented on a specially programmed computer system such as a special-purpose, technologically improved computer 400 illustrated in FIG. 4.

Input user device(s) 410, such as a keyboard and/or mouse, are coupled to a bi-directional system bus 418. The input user device(s) 410 are for introducing user input to the computer system and communicating that user input to processor 413. The computer system of FIG. 4 generally also includes a non-transitory video memory 414, non-transitory main memory 415, and non-transitory mass storage 409, all coupled to bi-directional system bus 418 along with input user device(s) 410 and processor 413. The mass storage 409 may include both fixed and removable media, such as a hard drive, one or more CDs or DVDs, solid state memory including flash memory, and other available mass storage technology. Bus 418 may contain, for example, 32 of 64 address lines for addressing video memory 414 or main memory 415. The system bus 418 also includes, for example, an n-bit data bus for transferring DATA between and among the components, such as CPU 409, main memory 415, video memory 414 and mass storage 409, where "n" is, for example, 32 or 64. Alternatively, multiplex data/address lines may be used instead of separate data and address lines.

I/O device(s) 419 may provide connections to peripheral devices, such as a printer, and may also provide a direct connection to a remote server computer system via a telephone link or to the Internet via an ISP. I/O device(s) 419 may also include a network interface device to provide a direct connection to a remote server computer system via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

In at least one embodiment, components of the data processing system 102 in one embodiment is implemented as a computer program. Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 409, into main memory 415 for execution. Computer programs may also be in the form of electronic signals modulated in accordance with the computer program and data communication technology when transferred via a network.

The processor 413, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 415 is comprised of dynamic random access memory (DRAM). Video memory 414 is a dual-ported video random access memory. One port of the video memory 414 is coupled to video amplifier 416. The video amplifier 416 is used to drive the display 417. Video amplifier 416 is well known in the art and may be implemented by any suitable means. This circuitry converts pixel DATA stored in video memory 414 to a raster signal suitable for use by display 417. Display 417 is a type of monitor suitable for displaying graphic images. The computer system described above is for purposes of example only.

Referring to FIG. 1, furthermore, in at least one embodiment, a driver-level network sniffer is installed on a database server, which is one embodiment of the data processing system 102. In at least one embodiment, the driver-level sniffer represents a component of the data transfer rate limiter 104. The driver-level network sniffer identifies a destination for TDS (tabular data stream) data, tracks the amount of data going to each destination, and evaluates the volume against a quota. If the quota is exceeded, the "sniffer" application will take an administrator-configured action, which may include raising an operator alert, slowing data access to that destination, stopping data flow to that destination, or simply logging the activity for future analysis. The actions may be configured based on a use case of the application. If being used for debugging or planning purposes, it may be sufficient to log activity so that an operator can identify the parts of the network where data is most heavily trafficked and why. If being used for data breach prevention, it may be more appropriate to stop access. In at least one embodiment, any action at the sniffer level can be overridden by an operator. For example, if a data requestor user workstation has gone above the data transfer quota and data transfer has been halted, an administrator should be able to restore connectivity if a valid reason for the extra usage is provided.

In at least one embodiment, an administrator utilizes an operator console to configure data rules. This application of the operator console can provide data to assist the operator in identifying normal operating patterns of the data processing system in order to deploy appropriate rule sets—for example, call station workstations may only access data during working hours and no more than 1 GB per day of throughput.

In at least one embodiment, a communications service which provides operator alerts, which may be used to allow users to request deviations. For example, if an accounts payable operator will be running a very comprehensive report, the accounts payable operator should be able to send a request to the application to allow this more extensive access, and an administrator operator is able to approve or deny this request. This service is interoperable with multiple communications platforms, including email, chat, and third party ticketing systems.

In at least one embodiment, an optional workstation level component can provide additional functionality, including allowing users to request deviations, informing users of the data quota and access status, and optionally providing end to end encryption services. Additionally, if the component is installed at both the workstation of a user and the server end of a channel, such as the data processing system 102, it is possible to encrypt and/or compress the network traffic.

An optional extension of the data processing system 102 includes, with deeper intelligence, the sniffer may identify the actual record count or type of data being requested and apply different filters based on different kinds of data. For example: allow unlimited access to a "Products" table but limit access to a "Customers" table.

Although embodiments have been described in detail, it should be understood that various changes, substitutions, and alterations can be made hereto without departing from the spirit and scope of the invention as defined by the appended claims.

What is claimed is:

1. A method of limiting and thereby reducing a data transfer rate of data from one or more databases, the method comprising:

determining a data transfer rate of the data from the one or more databases, wherein the data transfer rate is a rate of data transferred from each database in response to a database query;

identifying one or more query associated parameters of the query;

accessing data transfer rate limiting rules that reduce the data transfer rate;
applying one or more of the rate limiting rules to a conjoint analysis of:
(i) the data transfer rate;
(ii) the one or more query associated parameters in addition to the data transfer rate and parameters used to determine the data transfer rate; and
(iii) one or more maximum data rate transfer thresholds correlated to the one or more query associated parameters;
to determine a data transfer control action that limits the data transfer rate, and thereby reduces the data transfer rate, while continuing data transfer; and
applying the control action.

2. The method of claim 1 wherein the one or more maximum data rate transfer thresholds are correlated with multiple members of a group consisting of: a query requestor, a day in a week when the database query is received, a time period during a day when the database query is received, a sensitivity value of the data, a fixed data transfer rate value.

3. The method of claim 1 wherein determining whether the data transfer rate exceeds at least one of the maximum data rate transfer thresholds further comprises determining whether the data transfer rate exceeds multiple maximum data rate transfer thresholds.

4. The method of claim 3 wherein the one or more maximum data transfer thresholds comprise a number of bits of data transferred in a given period of time and a number of database records transferred in the given period of time.

5. The method of claim 1 wherein the conjoint analysis quantifies an amount of deviation of the data transfer rate from the one or more thresholds associated with an identity of a query requestor and a type and sensitivity of data requested.

6. The method of claim 1 wherein rate limiting rules include one or more members of a group consisting of: an excessive data transfer rate rule, a data transfer rate limit per user of the database, a data transfer rate limit per database, a data transfer rate limit per machine utilized to submit the database query, a data transfer rate limit per access credential of users of the database, and a data transfer rate limit per data type.

7. The method of claim 1 wherein the data rate control action comprises at least one member of a group consisting of:
logging in a memory the data transfer rate and one or query associated parameters to be logged in the memory;
sending an alert to one or more system administrators of the one or more databases;
degrading the data transfer rate;
controlling a messaging system;
controlling an alarm system;
controlling a database management operation;
shifting data access to a different database;
revoking a query requestor access to the database; and
suspending a query requestor access to the database.

8. The method of claim 1 wherein:
receiving a database query with a database management system;
retrieving data responsive to the database query;
passively monitoring a data transfer stream that includes the retrieved data; and
detecting a data transfer rate of the data transfer stream.

9. The method of claim 1 further comprising:
detecting the data transfer rate by executing driver code operating at an operating system level and determining the data transfer rate.

10. The method of claim 1 wherein:
the one or more query associated parameters of the query include at least one member of a group consisting of: an identity of a machine utilized to submit the database query, a user of the machine utilized to submit the database query, date and time of the query, and a table identifier of a location of the data transferred.

11. A system comprising:
a data processing system comprising:
a database;
database management system is configured to:
retrieve data from the database that is responsive to a received query;
transfer the responsive data in a data stream; and
a data transfer rate limiter in communication with the database management system, wherein the data transfer rate limiter is configured to:
determine a data transfer rate of the data from the one or more databases, wherein the data transfer rate is a rate of data transferred from each database in response to a database query;
identify one or more query associated parameters of the query;
access data transfer rate limiting rules that reduce the data transfer rate;
apply one or more of the rate limiting rules to a conjoint analysis of:
(i) the data transfer rate;
(ii) the one or more query associated parameters in addition to the data transfer rate and parameters used to determine the data transfer rate; and
(iii) one or more data rate transfer thresholds correlated to the one or more query associated parameters
to determine a data transfer control action that limits the data transfer rate, and thereby reduces the data transfer rate, while continuing data transfer; and
wherein the database management system is further configured to apply the control action.

12. The system of claim 11 wherein the database management system comprises a member of a group consisting of: SQL Server, dBase, Oracle, and Sybase.

13. The system of claim 11 wherein the data stream comprises a tabular data stream.

14. The system of claim 11 wherein the data is transferred in a data stream, and the data stream comprises a tabular data stream.

15. The system of claim 11 wherein the one or more data rate transfer thresholds are correlated with multiple member of a group consisting of a query requestor, a day in a week when the database query is received, a time period during a day when the database query is received, a sensitivity value of the data, a fixed data transfer rate value.

16. The system of claim 15 wherein the one or more data transfer thresholds comprise a number of bits of data transferred in a given period of time and a number of database records transferred in the given period of time.

17. The system of claim 11 whether the data transfer rate exceeds the data rate transfer threshold further comprises determining whether the data transfer rate exceeds multiple data rate transfer thresholds.

18. The system of claim 11 wherein the conjoint analysis quantifies an amount of deviation of the data transfer rate from the one or more thresholds associated with an identity of a query requestor and a type and sensitivity of data requested.

19. The system of claim 11 wherein rate limiting rules include one or more members of a group consisting of: an excessive data transfer rate rule, a data transfer rate limit per user of the database, a data transfer rate limit per database, a data transfer rate limit per machine utilized to submit the database query, a data transfer rate limit per access credential of users of the database, and a data transfer rate limit per data type.

20. The system of claim 11 wherein the data rate control action comprises at least one member of a group consisting of:
    logging in a memory the data transfer rate and one or query associated parameters to be logged by the memory;
    sending an alert to one or more system administrators of the one or more databases;
    degrading the data transfer rate;
    controlling a messaging system;
    controlling an alarm system;
    controlling a database management operation;
    shifting data access to a different database;
    revoking a query requestor access to the database; and
    suspending a query requestor access to the database.

21. The system of claim 11 wherein:
    receiving a database query with a database management system;
    retrieving data responsive to the database query;
    passively monitoring a data transfer stream that includes the retrieved data; and
    detecting a data transfer rate of the data transfer stream.

22. The system of claim 11 wherein the data transfer rate limiter comprises a data transfer rate detector, wherein the data transfer rate detector is configured to detect the data transfer rate by executing driver code operating at an operating system level and determining the data transfer rate.

23. The system of claim 11 wherein:
    the one or more query associated parameters of the query include at least one member of a group consisting of: an identity of a machine utilized to submit the database query, a user of the machine utilized to submit the database query, date and time of the query, and a table identifier of a location of the data transferred.

24. A non-transitory, computer readable program product comprising code stored therein and executable by one or more processors to:
    determine a data transfer rate of the data from the one or more databases, wherein the data transfer rate is a rate of data transferred from each database in response to a database query;
    identify one or more query associated parameters of the query;
    access data transfer rate limiting rules that reduce the data transfer rate;
    apply one or more of the rate limiting rules to a conjoint analysis of:
        (i) the data transfer rate;
        (ii) the one or more query associated parameters in addition to the data transfer rate and parameters used to determine the data transfer rate; and
        (iii) one or more data rate transfer thresholds correlated to the one or more query associated parameters
    to determine a data transfer control action including limiting the data transfer rate, and thereby reduces the data transfer rate, while continuing data transfer; and
    apply the control action.

* * * * *